Sept. 29, 1942.   A. LENTZ   2,297,485
CATERPILLAR TRACTOR
Filed May 28, 1940   3 Sheets-Sheet 3
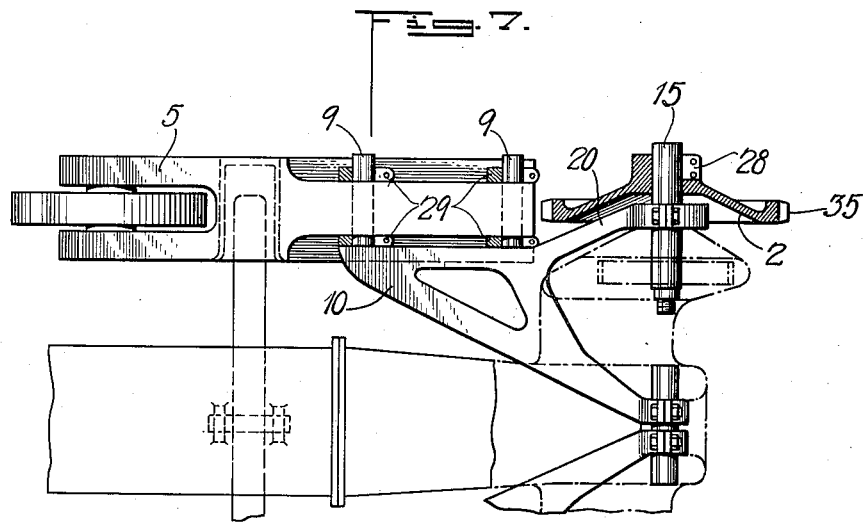
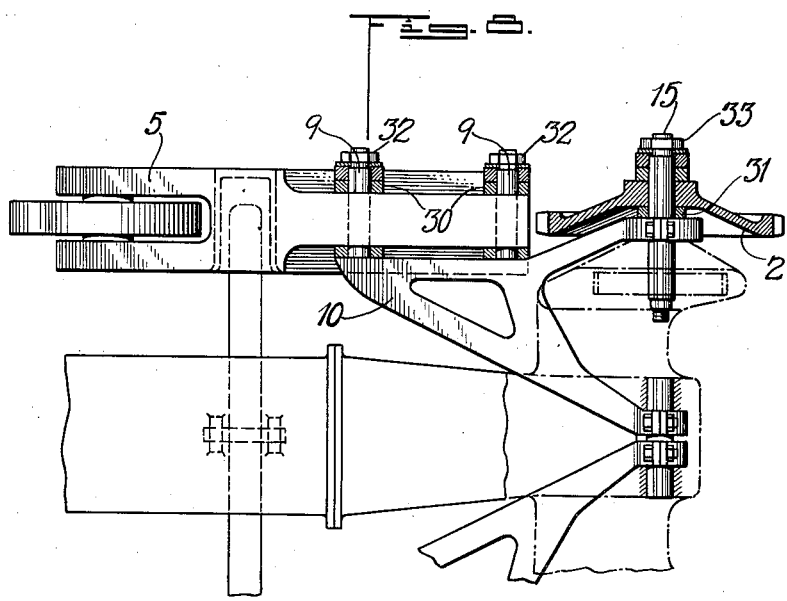
INVENTOR.
ANTON LENTZ.
BY
ATTORNEY.

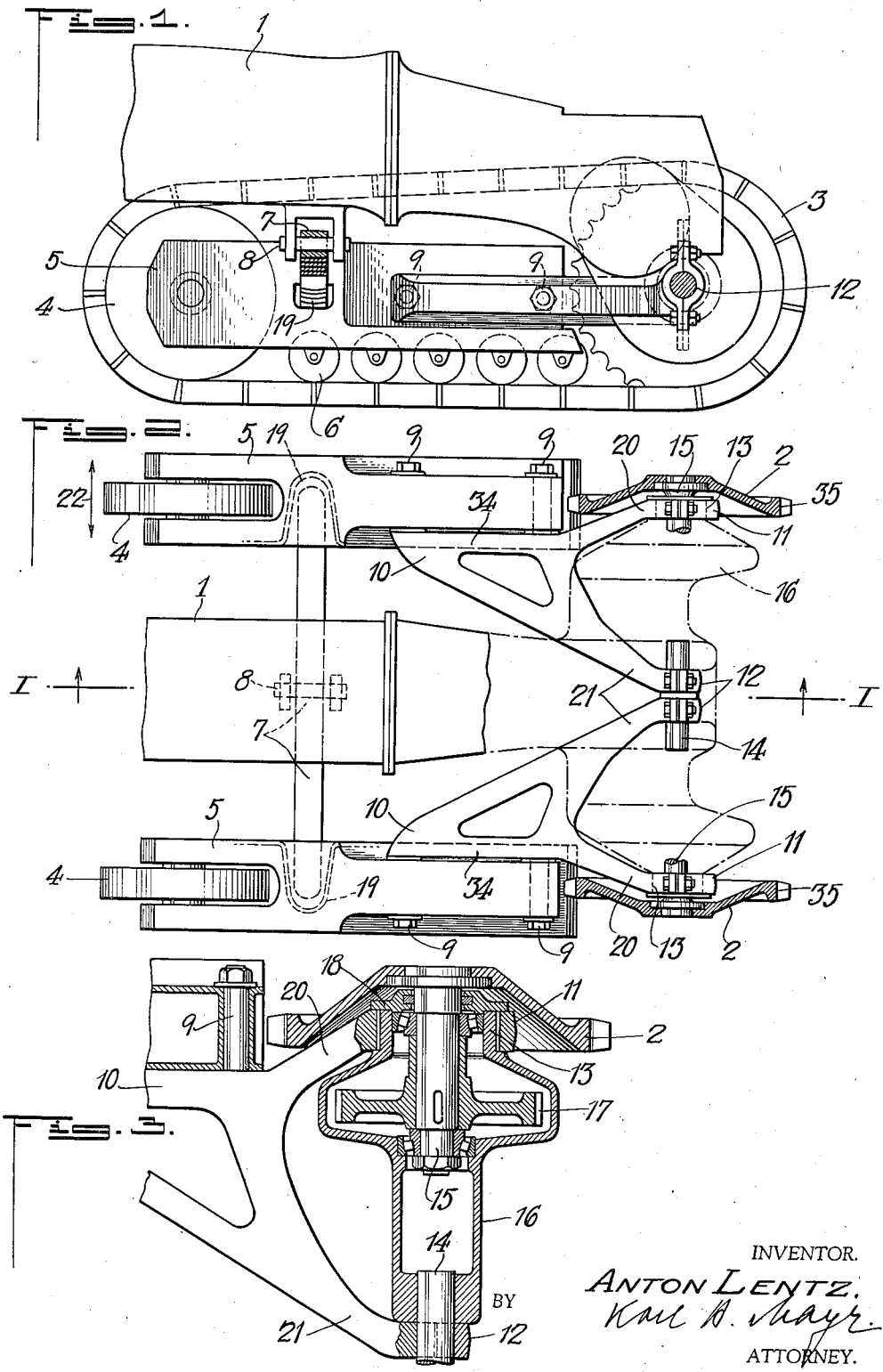

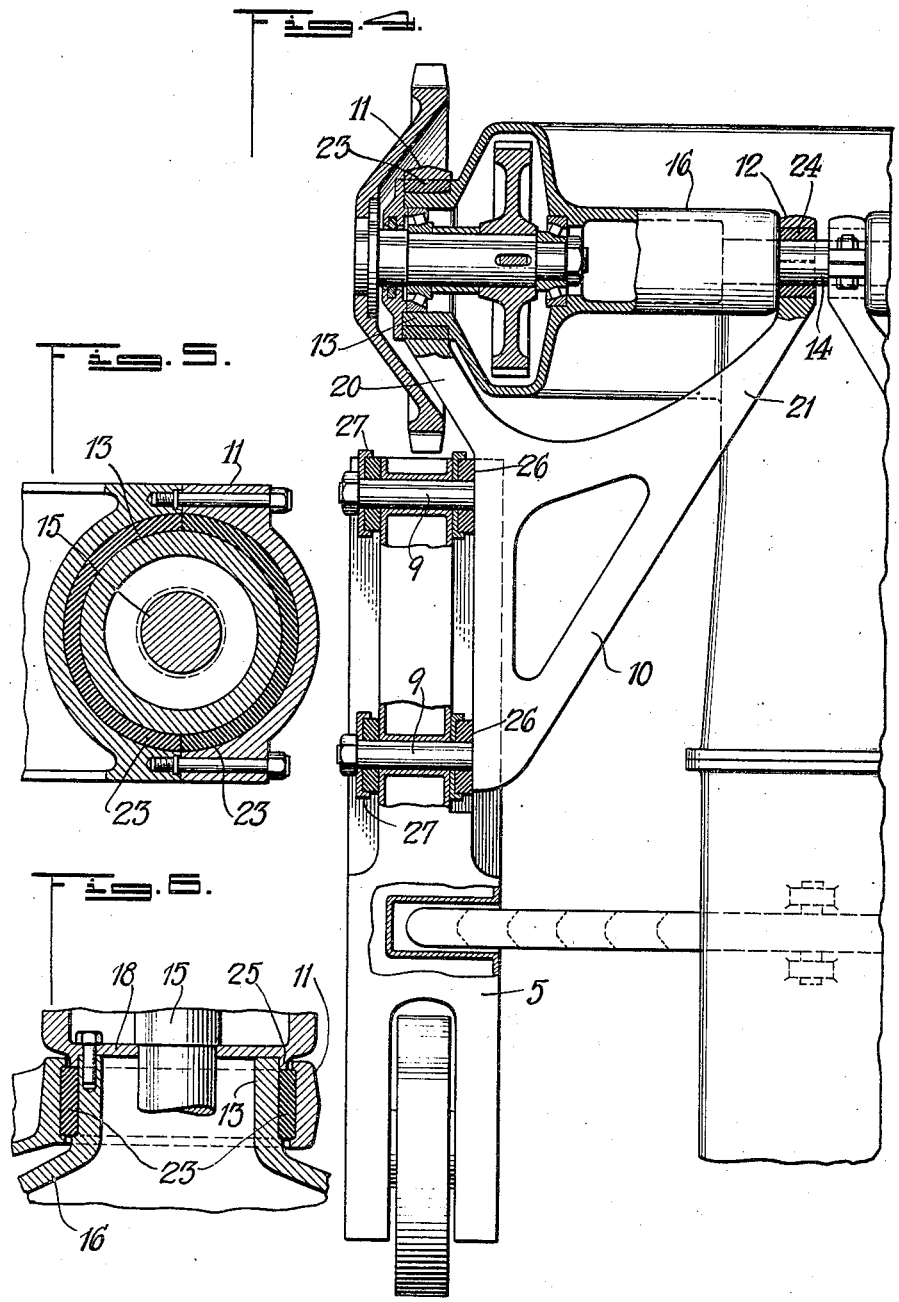

Patented Sept. 29, 1942

2,297,485

UNITED STATES PATENT OFFICE 2,297,485

CATERPILLAR TRACTOR

Anton Lentz, Heidelberg, Germany; vested in the Alien Property Custodian

Application May 28, 1940, Serial No. 337,585
In Germany June 9, 1938

15 Claims. (Cl. 305—9)

The present invention relates to a new design of caterpillar tractors particularly to the means for driving and supporting the caterpillar.

Caterpillar tractors are known in which the rollers supporting the caterpillar are carried directly by means of a support swingable about a bearing provided on the main frame; there is no special roller frame in the conventional machines of the type set forth. The said bearing is located at the interior side of the chain or sprocket wheel and the latter is of the overhung type. Undesired conditions in said bearing are produced by pressure acting laterally on the chain. In tractors provided with a roller frame the holder or support has been given a fork like configuration whereby the widely spaced individual bearings provide for a better distribution of lateral pressures. One bearing on said support fork is located at the inside and the other at the outside of the chain wheel which is therefore not of the overhung type and cannot be removed as long as the frame or holder is connected with the tractor; this condition makes assembling and dismantling difficult particularly when repairs are made in the field. The bearing support for the exterior fork bearing cannot be directly connected with the machine casing but must be arranged on the drive shaft, a condition which may cause bending of said shaft and damage to the bearing.

It is an object of the present invention to provide in a caterpillar tractor having a roller frame a fork like frame holder having widely spaced arms and a bearing on each of said arms which bearing is located at the inner side of the chain wheel so that said wheel is overhung on its shaft and can be mounted and removed without said frame or frame holder being in the way. With the arrangement according to the present invention the bearings disposed on the fork arms may be connected with the machine casing. Moreover, the roller frame can be laterally removed without difficulty without removal of the frame holder and/or the chain wheel. According to the invention the frame is connected with the frame holder by means of strong bolts, preferably spacer bolts, which traverse the frame and are screwed to the holder and serve also for stiffening the frame.

A further object of the present invention is to provide, in a caterpillar tractor of the type set forth, resilient means which permit a limited lateral movement of the roller frames whereby the bearings on the frame holders and the individual chain links are protected against overstress particularly when the tractor negotiates small diameter curves at high speed and/or when the broad chain links run over rough ground, stones, etc. With the arrangement according to the invention wear on the bearings and chain links is reduced and correct keeping to the track is maintained.

According to the invention elastic means are provided in between the fork like frame and one or both bearings on the arms of said frame, and/or between the roller frame and said fork like frame or roller frame holder. The resiliency of said elastic or resilient means is such that, under normal conditions, the chains run in the desired track and sudden abnormal lateral loads only are absorbed by the resilient means so that normal width of track is quickly restored as soon as the tractor has passed over the abnormal ground condition. The type of resilient means is immaterial to the present invention; helical or other metal springs as well as rubber or other suitable conventional means may be used.

A further object of the present invention resides in the provision of a tractor of the type set forth in which the width of the track or the distance of the caterpillar chains is adjustable. The roller frame and the chain wheel can be laterally displaced whereby clamping hubs, clamping rings or easily insertable spacer disks or the like means permit fixation of the roller frames and chain wheels at the desired distance from one another.

An object of the present invention is the provision, in a caterpillar tractor having a roller frame supported by a frame holder and swingable about the axis of the chain wheel, a concave inner surface on the chain wheels which covers the outer portion of the outer fork arm of the fork like roller frame support member and the bearing provided on said portion.

Further and other objects of the present invention will be hereinafter set forth in the accompanying specification and claims and shown in the drawings which, by way of illustration, show what I now consider to be preferred embodiments of my invention.

In the drawings:

Figure 1 is a longitudinal part sectional view taken through the center of a caterpillar support arrangement according to the invention and taken along line I—I of Figure 2.

Figure 2 is a part sectional top view of the arrangement shown in Figure 1.

Figure 3 is a part sectional horizontal view of the support arrangement according to the present invention.

Figure 4 is a part sectional horizontal view of a modified support arrangement according to the present invention.

Figure 5 is a cross sectional view of a shaft bearing used in the arrangement according to Figure 4.

Figure 6 is a longitudinal view of the bearing illustrated in Figure 5.

Figure 7 is a part sectional top view of the modified caterpillar support arrangement according to the present invention.

Figure 8 is a part sectional top view of another modification of a caterpillar support arrangement according to the present invention.

Like parts are designated by like numerals in all figures of the drawings.

Referring more particularly to Figures 1 to 3 of the drawings 1 designates the rump of the machine, 2 a chain wheel, 3 a chain, 4 a leading wheel, 5 a roller frame for the rollers 6, and 7 the forward support spring which is swingably connected with the machine body by means of a bolt 8. 10 designates a roller frame holder which is of fork like configuration having arms 20 and 21 and a stem portion 34 which is removably connected with the frame 5 by means of bolts 9 screwed into said stem portion. Arms 20 extend laterally outward and arms 21 inward. The fork bearings 11 and 12 are therefore spaced far apart and constitute a broad basis for absorbing lateral forces acting in the direction of arrows 22 in Figure 2. The fork bearings surround the bearing portions 13 and 14 of casing 16. Portion 13 is part of said casing and portion 14 a pin which is oil tight connected with casing 16. Instead of the pin a suitable projection may be provided directly on and form part of casing 16.

The driving wheel 17 is keyed to the drive shaft 15 within the oil tight casing 16. Chain wheel 2 is keyed overhung to shaft 15 outside of the casing. Wheel 2 has the shape of a hollow cone and covers the fork bearing 11 or 13 so that said bearing is substantially in the same plane as the rim 35 of wheel 2.

Only one packing ring 18 is needed between wheel 2 and the bearing part 13.

A pocket or cavity 19 is provided at the forward part of the roller frame and open towards the center of the machine for insertion of the spring 7 whereby complicated connecting means are unnecessary.

The machine body 1 has an end portion which is integral with the casing 16 and is directly supported by said casing. On the underside of another portion of the machine body projections are provided holding pin 8 which swingably supports the center portion of plate spring 7 the ends of which rest in the cavities or recesses 19 of the roller frame.

With the arrangement according to the present invention the chain wheel and/or the packing 18, and/or the frame 5 can be removed or exchanged without removal of the holder 10 or opening of the casing 16. The drive shaft 15 and its roller or ball bearings as well as the drive wheel 17 are protected from blows on the roller frame. Because of the outward bend of the arm 20, the cone shaped configuration of the chain wheel and the location of the outer fork bearing 11 in the cavity of the chain wheel greatest possible distance of the fork bearings, overhung arrangement of the chain wheel and favorable distribution of forces are obtained, the latter because chain, chain wheel, and chain wheel bearing are all positioned in the same zone.

Figures 4 to 6 illustrate the provision of resilient means in a construction of the type shown in Figures 1 to 3.

Elastic insertions 23 and 24 of the silent block type are provided between the stationary bearing portion 13 and 14 respectively of the casing 16 and the bearings 11 and 12 respectively, of the forcated roller frame holder 10. The elastic insertion 23 may be sufficient and insertion 24 be omitted; preferably both insertions are made in order to increase yieldability of the frame structure and avoid getting out of line of bearings 12 and 13.

The silent block 23 may be subdivided as shown in Figure 5 and may be held in place by the provision of projections 25 on the ring 18 and by constructing bearing 11 as to embrace the resilient means 23 as is shown in Figure 6.

In order to further increase lateral yieldability of the frame structure elastic insertions 26 and 27 may be provided between frame 5 and holder 10, preferably at the ends of the bolts 9.

In the embodiment of the invention according to Figures 1 to 6 the shaft 15 is provided with a flange for connection of the chain wheel 2. Instead of the flange connection a wedge and key way connection may be provided so that axial displacement of the chain wheel is made possible. In order to fix the wheel at a desired distance from the holder arm 21 the hub 28 of wheel 2 is constructed as a clamping hub as shown in Figure 7. The roller frame 5 is pushed on the bolts 9 of holder 10. The position of frame 5 relative to and its distance from the frame holder can be adjusted by means of the clamping rings 29. Loose clamping rings may be provided on both sides of the frame or one of the rings may be rigidly connected with the frame.

Figure 8 illustrates a modified arrangement for adjustable connection of the roller frame 5 with the frame holder 10. The desired track width is maintained by the provision of spacer disks or rings 30 and 31 which may be placed at the inside or outside of frame 5 and wheel 2 respectively. The spacer rings and frame 5 or wheel 2 are held in position by means of nuts 32 and 33 respectively screwed on threaded extensions of bolts 9 and shaft 15 respectively. The spacer disks or rings may be split or slotted or made in any other manner to permit exchange and removal without removal of the roller frame or chain wheel.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. In a caterpillar tractor, a machine body, a roller frame, a chain wheel, a fork like holder rigidly connected with said frame and having widely spread prong-like arms, a bearing means provided in each of said arms and swingably connecting said arms with said body, both said bearings being positioned coaxially with and inside of said chain wheel.

2. In a caterpillar tractor, a roller frame, a fork like holder having a stem portion rigidly connected with said frame and having two widely spread prong-like arms, a bearing means on each of said arms, a casing having two bearing portions individually supporting said bearing means and thereby swingably supporting said holder, and a chain wheel disposed outside of said casing and arms and coaxially with said bearing means.

3. In a caterpillar tractor, a machine body, a roller frame, a fork like holder having a stem portion rigidly connected with said frame and having an outer and an inner prong-like arm widely spread from one another, bearings individually connected with said arms and with said body, a chain wheel disposed outside of and concentrically with said bearings and having a concave side extending over the bearing on said outer arm and having a rim, the bearing on said outer arm being disposed substantially in the plane of said rim.

4. In a caterpillar tractor, a machine body, a roller frame, a fork like holder having widely spread prong-like arms swingably connected with said body and having a stem portion, a plurality of bolts connected with said stem portion and extending through said roller frame and forming the only connection between said frame and said holder.

5. In a caterpillar tractor, a machine casing having bearing portions, a roller frame, a fork like frame holder having bearing means swingably connecting said holder and said bearing portions, and connecting means connecting said roller frame and said holder, said bearing means and said connecting means comprising resilient elements adapted to resiliently afford minor relative movements of said casing with respect to said frame.

6. In a caterpillar tractor, a roller frame, a fork like holder having a stem portion rigidly connected with said frame and having two widely spread arms, a bearing means on each of said arms, a casing having two bearing portions individually supporting said bearing means and thereby swingably supporting said holder, and resilient means interposed between said bearing means and said bearing portions.

7. In a caterpillar tractor, a roller frame, a fork like holder having a stem portion rigidly connected with said frame and having two widely spread arms, a bearing means on each of said arms, a casing having two bearing portions individually supporting said bearing means and thereby swingably supporting said holder, and resilient rubber bodies interposed between said bearing means and said bearing portions.

8. In a caterpillar tractor, a roller frame, a fork like holder having a stem portion connected with said frame and having two widely spread arms, a bearing means on each of said arms, a casing having two bearing portions individually supporting said bearing means and thereby swingably supporting said holder, and resilient means interposed between said frame and said holder.

9. In a caterpillar tractor, a machine body, a roller frame, a fork like holder having widely spread arms swingably connected with said body and a stem portion, a plurality of bolts connected with said stem portion and extending through said roller frame, resilient means interposed between said frame and said holder and between said frame and said bolts, said resilient means and said bolts forming the only connection between said frame and said holder.

10. In a caterpillar tractor, a roller frame, a fork like holder having a stem portion and two widely spread prong-like arms, a bearing means on each of said arms, a casing having two bearing portions individually supporting said bearing means and thereby swingably supporting said holder, a drive shaft extending from said casing and being disposed coaxially with said bearing portions, a chain wheel positioned outside of said holder and axially adjustably connected with said drive shaft, and laterally adjustable connecting means interconnecting said frame with the outside of said stem part, whereby, upon adjustment of said connecting means and of said chain wheel with respect to said shaft, the width of the track of said tractor is changed.

11. In a caterpillar tractor, a roller frame, a fork like holder having a stem portion and two widely spread prong-like arms, a bearing means on each of said arms, a casing having two bearing portions individually supporting said bearing means and thereby swingably supporting said holder, a drive shaft extending from said casing and being disposed coaxially with said bearing portions, a chain wheel positioned outside of said holder and axially adjustably connected with said drive shaft, and laterally adjustable connecting means connecting the inside of said frame with the outside of said stem portion and extending through and outside of said frame, whereby, upon adjustment of said connecting means and of said chain wheel with respect to said shaft, the width of the track of said tractor is changed.

12. In a caterpillar tractor, a machine body, a roller frame, a chain wheel, a one piece fork like holder having a stem portion rigidly connected with said frame and having widely spread prong-like arms, a bearing means provided in each of said arms and swingably connecting said arms with said body, both said bearing means being positioned coaxially with and inside of said chain wheel.

13. In a caterpillar tractor, a machine body, a roller frame, a sprocket wheel, a fork like holder having a stem portion rigidly connected with said frame and having widely spread prong-like arm portions, a bearing means at the end of each of said arms portions swingably connecting said holder with said body, said arm portions extending beyond said frame and the outer of said arm portions forming the continuation of said frame, said sprocket wheel being disposed adjacent to and outside of the bearing means of the outer arm portion.

14. In a caterpillar tractor, a machine body, a pair of roller frames, a pair of sprocket wheels, a pair of one-piece fork like holders, each of said holders having a stem portion rigidly connected to the inside of one of said frames and having widely spread prong-like arm portions, a bearing means at the end of each of said arm portions swingably connecting said holders and said body, said sprocket wheels being individually positioned adjacent to and outside of the bearing means of the outer of said arm portions, said sprocket wheels and bearing portions all being positioned on the same axis.

15. In a caterpillar tractor, a machine body, a pair of roller frames, a pair of sprocket wheels, a pair of fork like holders, each of said holders having a stem portion rigidly connected to the inside of one of said frames and having widely spread prong-like arm portions, a bearing means at the end of each of said arm portions swingably connecting said holders and said body, said sprocket wheels being individually positioned adjacent to and outside of the bearing means of the outer of said arm portions, said sprocket wheels and bearing portions all being positioned on the same axis, said arm portions extending beyond said frames and the outer of said arm portions individually forming the continuation of said frames.

ANTON LENTZ.